United States Patent
Pinkerton, III et al.

(10) Patent No.: US 7,030,593 B2
(45) Date of Patent: Apr. 18, 2006

(54) MULTIPLE PATH VARIABLE SPEED CONSTANT FREQUENCY DEVICE HAVING AUTOMATIC POWER PATH SELECTION CAPABILITY

(75) Inventors: Joseph F. Pinkerton, III, Austin, TX (US); David A. Badger, Austin, TX (US)

(73) Assignee: Active Power, Inc., Austin, TX (US)

( * ) Notice: Subject to any disclaimer, the term of this patent is extended or adjusted under 35 U.S.C. 154(b) by 0 days.

(21) Appl. No.: 11/035,536

(22) Filed: Jan. 14, 2005

(65) Prior Publication Data

US 2005/0122084 A1 Jun. 9, 2005

Related U.S. Application Data

(63) Continuation of application No. 10/234,662, filed on Aug. 30, 2002, now Pat. No. 6,844,706.

(51) Int. Cl.
  *H02H 7/06* (2006.01)
  *H02P 9/00* (2006.01)
  *H02P 9/10* (2006.01)
  *F02N 11/00* (2006.01)

(52) U.S. Cl. .......................... 322/29; 322/32; 322/59; 290/52

(58) Field of Classification Search .............. 322/29, 322/32, 59; 290/52
  See application file for complete search history.

(56) References Cited

U.S. PATENT DOCUMENTS

| | | | | |
|---|---|---|---|---|
| 3,011,029 A | * | 11/1961 | Henning et al. | 379/285 |
| 3,515,896 A | * | 6/1970 | Drake et al. | 307/64 |
| 3,646,355 A | * | 2/1972 | Ireland et al. | 307/64 |
| 4,052,658 A | | 10/1977 | Hucker | 363/43 |
| 4,149,233 A | | 4/1979 | Frosch | 363/71 |
| 4,308,465 A | | 12/1981 | Lafuze | 307/87 |
| 4,446,343 A | * | 5/1984 | Golub et al. | 200/11 TC |
| 4,532,386 A | * | 7/1985 | Muench et al. | 200/11 TC |
| 4,559,421 A | * | 12/1985 | Lapke et al. | 200/51.1 |
| 4,625,160 A | | 11/1986 | Hucker | 322/32 |
| 4,811,136 A | * | 3/1989 | Jones et al. | 361/79 |
| 4,870,339 A | | 9/1989 | Furukawa et al. | 322/29 |
| 4,879,624 A | * | 11/1989 | Jones et al. | 361/65 |
| 4,959,554 A | * | 9/1990 | Underwood et al. | 307/38 |

(Continued)

FOREIGN PATENT DOCUMENTS

EP  1447897 A1 *  8/2004

(Continued)

*Primary Examiner*—Darren Schuberg
*Assistant Examiner*—Pedro J. Cuevas
(74) *Attorney, Agent, or Firm*—Fish & Neave IP Group of Ropes & Gray LLP; Andrew Van Court (57) ABSTRACT

The present invention relates to variable speed constant frequency (VSCF) devices and methods for maximizing engine generator efficiency. In one embodiment, a VSCF device may include at least two paths for conducting power to the load. One path, a line inductor path, may advantageously incur minimal power loss when the engine generator is supplying rated power to a load. A second path, a VSCF path, may be used to ensure that the frequency of the power is maintained at a substantially constant frequency under various load conditions. Another embodiment of the invention describes a process for determining optimal engine generator speed for a particular load. Because engine speed can be varied using any VSCF device, this process determines a speed that minimizes fuel consumption, emissions, and noise pollution for a given load.

16 Claims, 6 Drawing Sheets

U.S. PATENT DOCUMENTS

| | | | |
|---|---|---|---|
| 5,021,615 A * | 6/1991 | Muench et al. | 200/11 TC |
| 5,040,105 A | 8/1991 | Dhyanchand et al. | 363/43 |
| 5,041,957 A | 8/1991 | Dhyanchand et al. | 363/43 |
| 5,055,764 A * | 10/1991 | Rozman et al. | 322/10 |
| 5,193,054 A | 3/1993 | Galloway et al. | 363/72 |
| 5,245,525 A | 9/1993 | Galloway et al. | 363/71 |
| 5,282,125 A | 1/1994 | Dhyanchand et al. | 363/49 |
| 5,376,828 A | 12/1994 | Kim et al. | 307/64 |
| 5,402,054 A | 3/1995 | Eckersley | 318/801 |
| 5,623,135 A * | 4/1997 | Hashimoto et al. | 200/50.21 |
| 5,627,744 A | 5/1997 | Baker et al. | 363/165 |
| 5,646,458 A | 7/1997 | Bowyer et al. | 307/67 |
| 5,729,118 A | 3/1998 | Yanagisawa et al. | 322/29 |
| 5,786,552 A * | 7/1998 | Dohnal et al. | 200/11 TC |
| 5,787,075 A * | 7/1998 | Uchida | 370/252 |
| 5,886,893 A | 3/1999 | Asai et al. | 363/161 |
| 5,943,221 A | 8/1999 | Asai et al. | 363/10 |
| 5,998,881 A | 12/1999 | Wind et al. | 290/40 A |
| 6,169,390 B1 | 1/2001 | Jungreis | 322/4 |
| 6,175,217 B1 | 1/2001 | Da Ponte et al. | 322/19 |
| 6,281,664 B1 | 8/2001 | Nakumura et al. | 322/22 |
| 6,295,215 B1 | 9/2001 | Faria et al. | 363/37 |
| 6,339,316 B1 | 1/2002 | Eguchi et al. | 322/59 |
| 6,344,988 B1 | 2/2002 | Asai et al. | 363/149 |
| 6,380,639 B1 | 4/2002 | Soucy | 290/40 B |
| 6,784,565 B1 | 8/2004 | Wall et al. | 290/52 |
| 6,784,634 B1 | 8/2004 | Sweo | 318/727 |
| 6,787,933 B1 | 9/2004 | Claude et al. | 290/52 |
| 6,825,426 B1 * | 11/2004 | Muench et al. | 200/11 R |
| 6,844,706 B1 * | 1/2005 | Pinkerton et al. | 322/29 |
| 6,897,577 B1 * | 5/2005 | Weeber et al. | 290/52 |
| 6,975,946 B1 * | 12/2005 | Al-Hamrani | 702/60 |
| 2003/0015875 A1 | 1/2003 | Fukaya | 290/40 C |

FOREIGN PATENT DOCUMENTS

| | | | |
|---|---|---|---|
| JP | 10070480 A * | 3/1998 | |
| JP | 2004248487 A * | 9/2004 | |
| SU | 416686 A * | 7/1974 | |
| WO | WO 2004032165 A2 * | 4/2004 | |

* cited by examiner

MULTIPLE PATH VARIABLE SPEED CONSTANT FREQUENCY DEVICE HAVING AUTOMATIC POWER PATH SELECTION CAPABILITY

This is a continuation of U.S. patent application Ser. No. 10/234,662, filed Aug. 30, 2002, now U.S. Pat. No. 6,844,706, which is hereby incorporated by reference in its entirety.

BACKGROUND OF THE INVENTION

The present invention relates to variable speed constant frequency devices and methods for maximizing engine generator efficiency. In particular, the present invention relates to maximizing the efficiency of an engine generator using a multi-path variable speed constant frequency device.

Engine generators are typically used to provide power independent of that provided by a public utility. Engine generators may be used, for example, as primary power generators that provide a reliable source of power for industrial, commercial, and residential applications. For example, an industrial application such as a high value manufacturing process may require a reliable source of electricity to ensure that product development (e.g., semiconductor fabrication) is not damaged by power fluctuations or power loss (e.g., caused by transmission line malfunction). A mining operation that is too remote to access a utility power grid may require an engine generator to provide power for day-to-day mining operations. A commercial application may include, for example, a communication facility (e.g., broadcasting, telephone, Internet, etc.) that requires an independent power source (e.g., engine generator). Thus facilities that are not readily accessible to a utility grid may rely on, for example, engine generators to provide continuous service to customers that rely on such facilities.

Engine generators generally include a fuel powered engine and a generator. The engine typically operates at a predetermined speed to drive a shaft, which causes a generator (e.g., synchronous generator) to generate power. The frequency of the power generated by the engine generator is typically dependent on engine speed. Thus, the faster the engine operates, the greater the frequency of the generated power. Because engine generators are typically used to provide a substantially constant frequency (e.g., 50/60 Hz), the engine continuously operates at a substantially constant speed.

Figure 1:
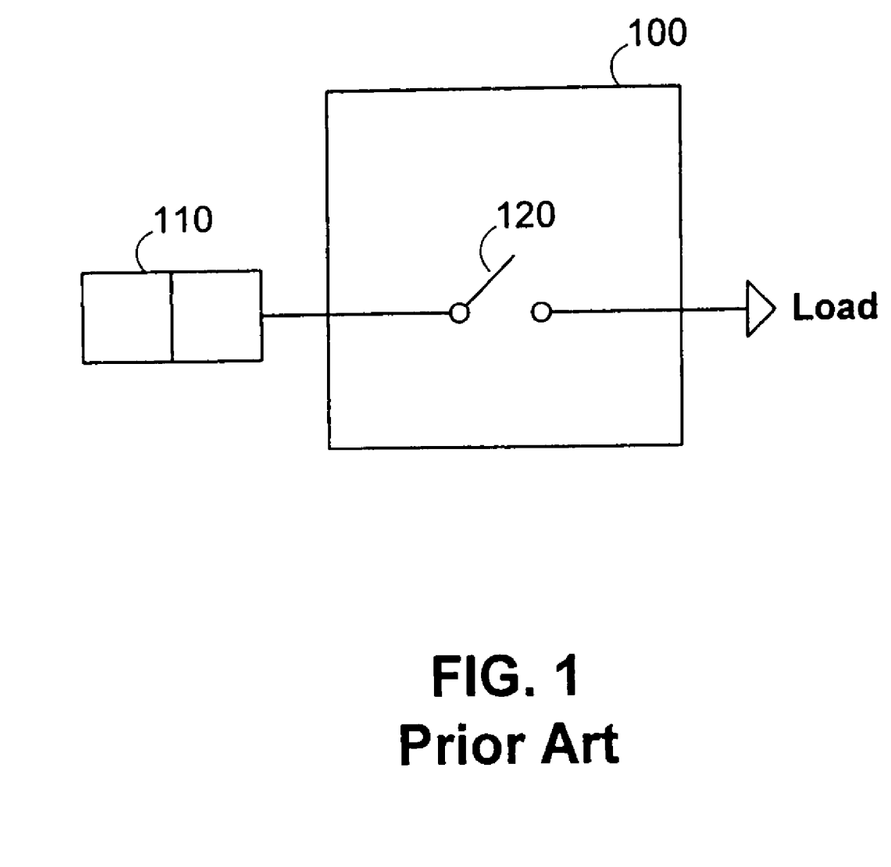
FIG. 1 illustrates a conventional configuration for providing power to a load.

FIG. 1 illustrates device 100, which is a conventional standard line connection that couples engine generator 110 to a load via switch 120. This standard line connection is particularly useful and efficient for providing power to constant, nonvarying loads. In addition, device 100 is useful if the engine operates at a substantially constant speed. Because effective device 100 operation is dependent on constant load and constant engine operating speed, there are several drawbacks to device 100.

One problem with device 100 is that it cannot modify or change the frequency of the power generated by the engine generator. That is, device 100 routes power to the load at the frequency generated by the engine generator. This limitation requires that the engine operate at the same speed to provide power at the frequency required by the load. Thus, when the load draws less power than the engine generator is capable of producing, the engine may burn excess fuel. Assuming that the engine has a specified power rating, the engine wastes fuel whenever the load requires substantially less power than that of the engine's power rating.

Another problem with device 100 is that the engine generator cannot maintain a constant frequency when the load experiences changes (step changes) in demand (e.g., caused by activating an air conditioner). To compensate for this deficiency, engines have to be dramatically oversized to handle step changes in load. If the engine is oversized, then it may be forced to generate power at a level much lower than it is capable of producing. Thus, maximum utility of the engine is not realized.

Figure 2:
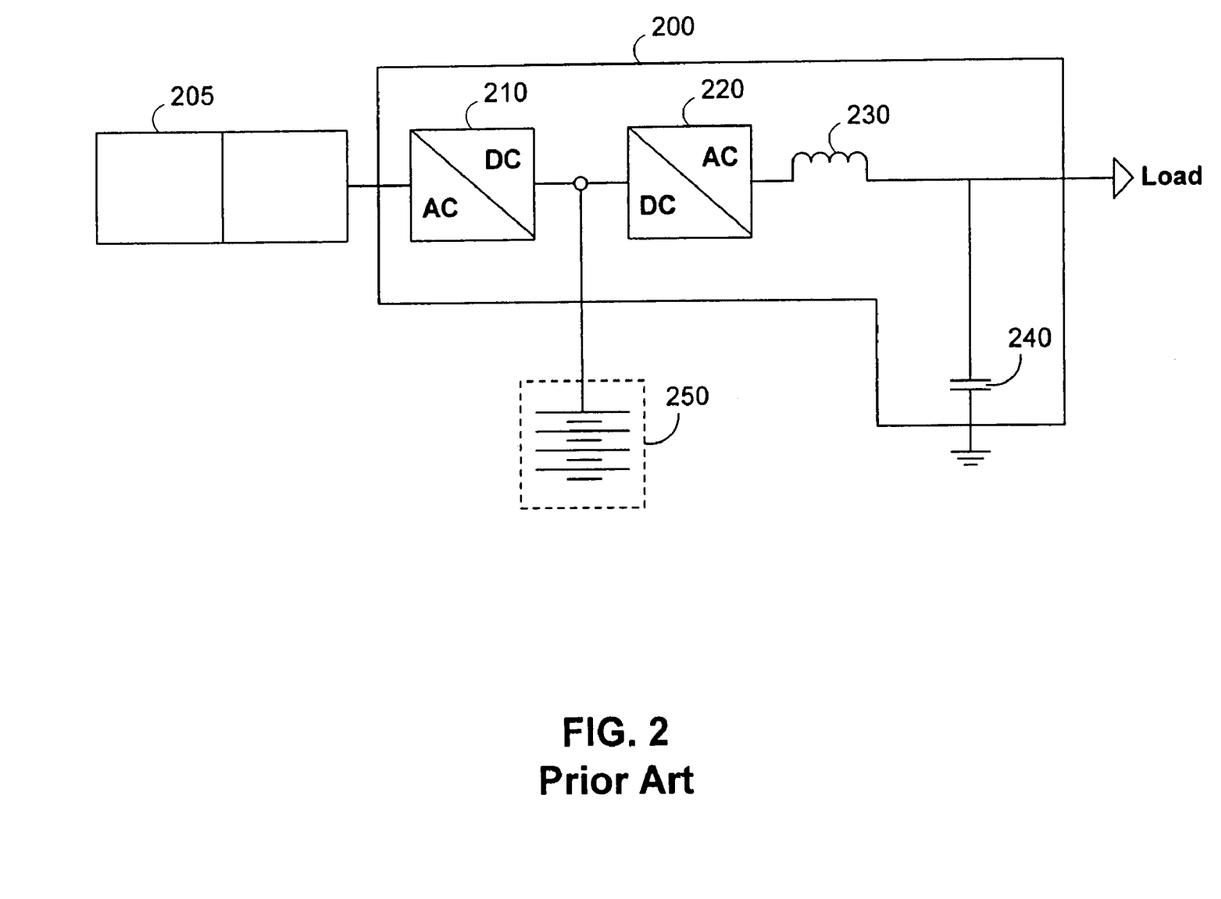
FIG. 2 illustrates a conventional VSCF configuration for providing power to a load.

To rectify the problems associated with device 100, variable speed constant frequency (VSCF) devices have been developed. FIG. 2 illustrates VSCF device 200 that enables an engine generator to operate at various speeds and still be able to provide power at a constant frequency to the load. Device 200 includes rectifier 210, inverter 220, inductor 230, and capacitor 240. Engine generator 205 is coupled to rectifier 210 and inductor 230 is connected to the load. Optional battery 250 or other transient power source may be connected to inverter 220.

Rectifier 210 and inverter 220 (i.e., converter pair) operate in conjunction with each other such that the engine can operate at variable speeds and provide power at a constant frequency to the load. But the converter pair constantly consumes energy (e.g., exhibited as heat loss) regardless of whether the engine generator is producing the required frequency. Thus, when the engine generator is operating under full load, its fuel efficiency is less than that when device 100 of FIG. 1 is used to deliver the same power. VSCF device 200 provides fuel savings when fuel consumption decreases to a point where the energy saved by decreased engine speed outweighs the converter pair's energy dissipation.

The converter pair actively modifies the frequency of the generator output signal when the load experiences step changes. But sometimes the step change in load is too great for the engine and the VSCF devices to handle. For example, if an air conditioning unit turns on, the engine may experience a brief lull in power generation for which the VSCF device cannot adequately compensate.

VSCF device 200 overcomes the problem with load changes by providing optional battery 250 or other transient power source. Inverter 220 may draw power from battery 250 to maintain a constant frequency when the load is experiencing a step change. But battery 250 is typically bulky, toxic, requires extensive maintenance, and must be replaced frequently. In addition, the battery adds to the actual size of floor space required for engine generator, batteries, etc.

Moreover, VSCF device 200 is less reliable than VSCF device 100 because rectifier 210 or inverter 220 failure would prevent power delivery to the load.

VSCF devices enable engines to run at various speeds while providing power at a specified frequency. Typically, the engine is instructed to operate at the speed required to generate enough power to supply the load. Running the engine at this speed, however, may not be the most economical speed to conserve fuel, to maximize power density, or to minimize noise or emissions of the engine. The engine may be able to run at more optimal speeds, and still provide the required power. In fact, engines operating without a VSCF device often do not provide adequate power density because it has to operate at a speed less than its optimal RPM rating so that it can provide a desired constant frequency output.

In view of the foregoing, it is an object of this invention to provide a multi-path VSCF device that provides power to a load at a substantially constant frequency.

It is a further object of this invention to maximize fuel efficiency while supplying power to a load.

It is also an object of this invention to operate the engine at an optimal speed for any given load such that emissions and noise are minimized.

It is also an object of this invention to enable engines to operate at rated speed to provide sufficient power density and a desired frequency output.

SUMMARY OF THE INVENTION

These and other objects of the present invention are accomplished in accordance with the principles of the invention by providing a multi-path VSCF device that maximizes the efficiency of an engine generator based on the load, engine, or other desired operating characteristics. The multi-path VSCF device enables the engine generator to operate at different speeds, depending on the load. Because loads typically cycle between high and low demand, the engine generator does not have to operate at the same speed to generate power required for the load. The VSCF device enables the engine generator to slow down during low-loads, thereby conserving fuel. Thus, the present invention enhances fuel economy and reduces noise and air pollution.

The VSCF device of the present invention may utilize at least two separate paths to optimize power delivery to the load while maintaining constant frequency. The VSCF device automatically selects which path is best for optimizing usage of the engine generator. For example, when the engine generator is operating at synchronous speed (e.g., engine is running at a specified speed to supply the engine's rated power at the required output frequency), the present invention may route power through a standard non-VSCF path to the load. Power may be provided through a standard line path because the generator provides power at a specified frequency and does not have to be modified. Moreover, power loss is negligible when power is delivered to the load through the standard line path because there is no loss attributable to the converter pair.

The VSCF device may automatically route generator power through a VSCF path whenever the standard line path cannot provide the load with the required frequency. Power may be routed through the VSCF path under a variety of circumstances. For example, the VSCF path may be selected and used when the load demand is low. When load demand is low, the present invention may instruct the engine to operate at a lower speed. Slowing the engine down reduces fuel consumption, wear and tear on the engine, noise pollution, emissions, and other engine characteristics. When the engine slows down, however, it may not be able to generate power at the required frequency. Therefore, the VSCF path may modify the frequency of the generator output and provide a corrected power signal to the load.

The VSCF path may also be selected and used to instruct the engine generator to operate in super synchronous mode. The engine generator operates in super synchronous mode to increase the power density of the engine. Increased power density makes the engine generator less susceptible to step changes in load and maximizes the engine's output power. In addition, utilizing increased power density of an engine provides a basis for using smaller engine generators for a given load. The VSCF device enables the engine to operate at rated speed or higher, which corresponds to increased power density. Even though the engine is operating at higher speeds, which may produce an undesired output frequency, the VSCF device of the present invention modifies the output frequency to provide the desired frequency to the load.

In another example, the present invention may change the VSCF path when the load experiences changes in load demand. Because changes in load demand can cause the engine generator to generate power that does not meet the load's frequency requirement either too fast or too slow, the VSCF path may modify the generator's output signal to compensate for frequency variation. In addition, a transient power source such as a flywheel energy conversion device may be coupled to the VSCF path to compensate for substantial step changes in power demand. Moreover, the transient power source may provide step shielding that ensures that the load is supplied with power having a specific frequency.

One advantage of using the multi-path VSCF device is that the engine can be sized according to the maximum power required by the load. That is, the engine can be sized specifically to the load requirements. For example, if the load consumes a maximum of 1,000 kVA of power, then an engine that has a power rating of about 1,000 kVA is required. Because the VSCF device of the present invention is capable of compensating for step changes in the load by allowing the engine to run at its optimum speed for power density, as opposed to speed needed to synchronize to the load frequency, a substantially larger engine is not required. As mentioned above, oversized engines have traditionally be used to provide power at constant frequency during step changes.

The VSCF device path can be used when it is advantageous for the engine generator to operate at speeds greater than or less than synchronous speed (e.g., usually 1500 or 1800 RPMs). Assume, for example, that a high speed engine (i.e., an engine that operates above synchronous speed to produce the desired output frequency) is coupled to the multi-path VSCF device. Also assume that when the engine operates at rated speed, it produces a power signal having frequency higher than that required by the load. When the load demand is high, the VSCF path may be used to provide power at the necessary frequency. When the load demand is low, the standard line path may be used because the engine may operate at a reduced speed that produces the required frequency.

It may be advantageous to operate the engine generator at speeds other than the synchronous speed to maximize fuel efficiency and power density. It may also be advantageous to vary the engines speed to minimize emissions, audible noise, and wear on parts.

Another advantage of the VSCF device of the present invention is that the multi-path configuration provides redundant power paths to the load. If one of the paths (e.g., VSCF path) fails, the other path can be used to provide power to the load. This provides an inherent failsafe mechanism that adds a degree of assurance that the load will be continuously supplied with power.

The present invention also provides methods for operating the engine at an optimal engine speed for a particular load. This method can be applied to an engine coupled to any suitable VSCF device. That is, this optimal engine speed method is not limited to being used solely with the multi-path VSCF device described above. The optimal engine speed method varies the speed of the engine and calculates fuel efficiency at each different speed. If desired, the method can also monitor engine power density, engine noise, engine emissions, or other engine characteristics. After a range of speeds have been tested, the method instructs the engine to run at the most optimal speed for that particular load. When the optimal engine speed is obtained, fuel efficiency, or power density is maximized. In addition, noise and emissions pollution are also reduced. It should be noted, however, that the optimal engine speed for each characteristic may be different.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 3:
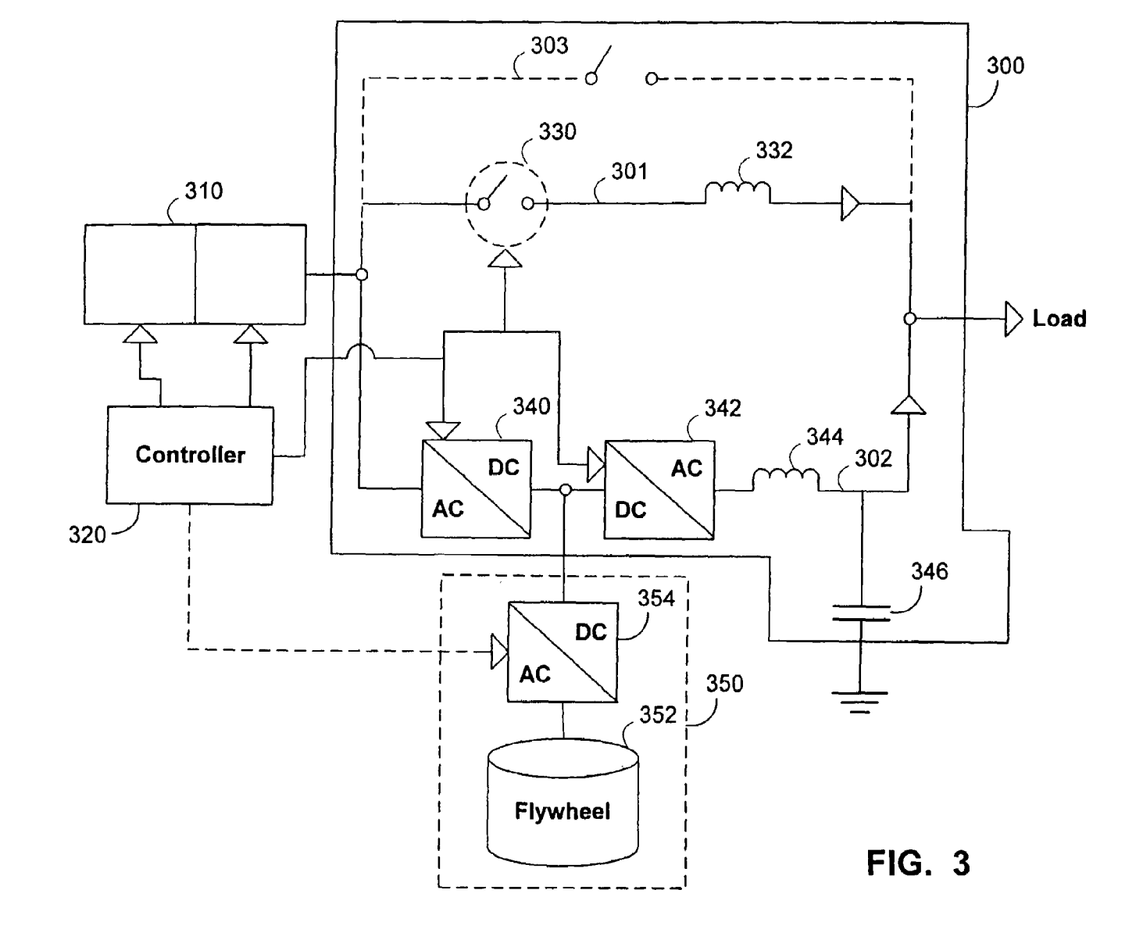
FIG. 3 illustrates a multi-path VSCF device that provides power to a load in accordance with the principles of the present invention.

FIG. 3 illustrates a multi-path variable speed constant frequency ("VSCF") device 300 which is in accordance with the principles of the present invention. FIG. 3 shows engine generator 310 connected to VSCF device 300 so that generated power can be provided to the load via line inductor path 301 and VSCF path 302. If desired, optional bypass path 303 may provide yet another path for delivering power to the load. Persons skilled in the art will appreciate that other specialized circuit paths may also be used, in which case they would be connected in parallel between the engine generator and the load, without departing from the spirit of the present invention.

Engine generator 310 is well known in the art. A typical engine generator 310 includes an engine (e.g., diesel or natural gas engine) and a generator. The engine operates as a prime mover that rotates, for example, a shaft coupled to the generator. As the shaft rotates, electrical power is generated and provided to the load.

In general, one of the primary functions of an engine generator is to provide power at a predetermined frequency. That is, the engine may operate at a specified speed so that the generator provides power at the predetermined frequency. As previously described in conjunction with FIG. 1, an engine generator generally operates at a constant speed so that the generator will provide the desired constant frequency. One advantage of the present invention is that VSCF device 300 enables engine generator 310 to operate at different speeds. This provides potential energy savings in that the engine may not have to operate at the same constant speed under different conditions, such as for varying loads. For example, assume that the engine typically operates at 1800 RPM to provide power for a "normal" load. Next, assume that the load demand drops to a nominal level. Instead of having the engine operate continuously at 1800 RPM, VSCF device 300 allows the engine to operate at a slower speed to conserve fuel, and to reduce wear on parts and emissions. Even though the engine is operating at low speed, VSCF device 300 provides the specified frequency to the load using VSCF path 302. This is analogous to an automobile at a stop light. The automobile's engine idles at a much lower RPM when the car is stopped than when the car is accelerating, thereby conserving fuel while stopped.

VSCF device 300 maximizes the efficiency of engine generator 310 by automatically selecting which path is best for providing power to the load and controlling the speed of the engine based on several parameters. Controller 320, which may be coupled to engine generator 310, switch 330, ac-dc converter 340, dc-ac converter 342, and flywheel inverter 352 determines which path is best for providing power to the load. As defined herein, controller can also be referred to as control circuitry. Typically, line inductor path 301 may be used when the engine generator can provide power at the requisite frequency to the load without assistance. VSCF path 302 is used when power provided to the load is subject to frequency distortion.

An ac-dc converter is used to convert an AC signal to a DC signal, and one such device that can perform this conversion is a rectifier. As defined herein, rectifier 340 is referred to as a device that performs ac-dc conversion. Conversely, a dc-ac converter is used to convert a DC signal to an AC signal, and one such device that can perform this conversion is an inverter. As defined herein, inverter 342 is referred to as a device that performs dc-ac conversion.

If the demand of the load is normal (i.e., engine generator 310 is operating at rated speed), controller 320 may close switch 330 and enable engine generator 310 to provided power through line inductor path 301. If the load requires a sudden abrupt increase or step in power, controller 320 may increase engine speed, open switch 330 and enable power to flow through VSCF path 302 to the load. In addition, if the load requires relatively low power, controller 320 may decrease engine speed, provide power through VSCF path 302. Thus, routing power through VSCF path 302 enables VSCF device 300 to handle step changes in load demand.

Controller 320 can instruct engine generator 310 to maximize its engine speed to increase power density. For example, assume that an engine generator is configured to provide power for a given load for its usual day-to-day power cycle. If the load demand dramatically increases, controller 320 can instruct engine generator 310 to operate at a higher speed to maximize power density and thereby supply power to the load (while sacrificing fuel efficiency). When the load demand returns to normal levels, controller 320 can instruct engine generator to operate at its "regular" speed.

As shown in FIG. 3, line inductor path 301 includes switch 330 and inductor 332. When engine generator 310 is operating at or near rated load, line inductor path 301 advantageously provides a path that incurs minimal power loss. Moreover, inductor 332 has a relatively low inductance value so the resultant voltage drop is negligible. Because the inductance of inductor 332 is relatively low, the load voltage can be matched to the voltage provided by engine generator 310. One advantage of voltage matching is that controller 320 can control the voltage provided to the load. Persons skilled in the art will appreciate that line inductor path 301 can be free of any components such as inductors and capacitors such that a substantially direct connection exists between engine generator 310 and the load.

Also shown in FIG. 3, VSCF path 302 includes rectifier 340, inverter 342, inductor 344, and capacitor 346. As described above, VSCF path 302 may be used when engine generator 310 operates at a slower than synchronous speed or when changes (e.g., steps) occur in load demand. The combination of rectifier 340 and inverter 342 operate to provide and/or maintain a specified frequency of power to the load. For example, if there is a relatively low load, controller 320 may select path 302 and slow down engine generator 310 to conserve fuel. Because engine generator 310 is operating at a lower speed, it may no longer provide power at a predetermined frequency. Therefore, controller 320 may instruct rectifier 340 and inverter 342 to increase or decrease the frequency of the power signal provided by engine generator 310, accordingly, to provide the desired frequency to the load. Once the frequency of the power signal is corrected, the power is conducted through inductor 344 to the load.

Another advantage of using voltage matching is that inverter 342 can be used to control power flow of the power between engine generator 310 and the load. Use of inverter 342 enables engine generator 310 to provide power (via path 301) in a power factor corrected mode (i.e., power provided to load only has a real power component and no reactive power component). Controller 320 may accomplish this by instructing inverter 342 to absorb, for example, the reactive power provided by the load. Absorbing reactive power ensures that engine generator 310 does not "see" any reactive load. By using power factor correction, delivery of power to load is maximized.

Rectifier 340 may be an active rectifier such as, for example, a silicon controlled rectifier (SCR), a thyristor, an insulated gate bipolar transistor (IGBT) or any other suitable type of device. Persons skilled in the art will appreciate that any suitable circuitry can be implemented to perform rectification of a sinusoidal signal generated by engine generator 310. For example, three IGBT pairs may be used to rectify a three phase signal provided by engine generator 310. It will also be appreciated that non-active rectifiers such as diodes can be used to rectify AC signals.

Inverter 342 may include, for example, several transistors that can be controlled using pulse-width modulation. In one suitable approach, inverter 342 may be implemented using three pairs of IGBTs that are controlled by controller 320. Controller 320 may provide a pulse-width modulation signal to the IGBTs to modify, for example, the frequency of the power provided to the load. Inverter 342 may be capable of frequency conversion, voltage regulation, or any other suitable signal modification. Persons skilled in the art will appreciate that any suitable combination of rectifiers and inverters may be used in VSCF device 300.

After a signal passes through inverter 342, it may be filtered by inductor 344 and capacitor 346. Inductor 344 and capacitor 346 may be used together to form a LC filter that is capable of filtering, for example, unwanted harmonics that are generated by inverter 342. Preferably, inductor 344 and capacitor 346 are matched to provide a power signal at the specified frequency required by the load.

VSCF path 302 is also utilized when step changes in load occur. Load changes may occur, for example, when load cycle changes from night to day. During the day, commercial, industrial, and residential demand for power increases, thereby demanding greater power generation from engine generator 310. In some instances, the power increase may not be gradual, but may occur in steps. When a step in load demand occurs, engine generator 310 may not be able to provide power at constant frequency. Thus, when such a step occurs, controller 320 may send signals to rectifier 340 and inverter 342 to compensate for any surplus or deficiency in frequency. Controller 320 may also send signals to engine generator 310 to increase its speed to thereby produce more power.

In some load environments, steps in load demand may be too great for rectifier 340 and inverter 342 to handle independently. In environments such as this, a transient power source 350 may be coupled to VSCF path 302 to provide power to compensate for changes in load demand. For example, transient power source 350 may be coupled to VSCF path 302 to provide such assistance. In particular, transient power source 350 may be coupled to VSCF path 302 between rectifier 340 and inverter 342. Transient power source 350 may include flywheel energy conversion assembly 352 that provides power on demand. Transient power source 350 may also include circuitry such as converter 354 (e.g., a rectifier) that provides power from flywheel assembly 352 to VSCF path 302. Converter 354 may be controlled by controller 320. Converter 354 preferably converts the AC signal generated by flywheel assembly 352 to a DC signal so that inverter 342 can readily utilize the power to compensate for the step load.

If desired, controller 320 may route power from engine generator 310 to transient power source 350 via rectifier 340 and converter 354. Providing power to transient power source 350 in this manner enables the generator/VSCF combination to be self sufficient. That is, transient power source 350 does not require utility power to be kept in a "ready state" to provide power on demand. Rather, engine generator 310 can provide the power required by transient power source 350.

Persons skilled in the art will appreciate that any suitable device can be coupled to VSCF path 302 to assist engine generator 310 in maintaining a desired frequency for steps in the load. For example, batteries may be used to add supplemental power to inverter 342 during step changes in load.

One advantage of using a transient power source to compensate for changes in load is that smaller engine generators can be used in conjunction with VSCF device 300. When devices such as transient power source 350 are not utilized, larger, more expensive, and less economical engine generators are required to adequately handle all load changes and still be able to provide a substantially constant frequency. Furthermore, the VSCF device allows the engine to operate at a more optimal RPM to achieve maximum power density. Thus a smaller engine can be used for a given load.

An advantage of VSCF device 300 is that the multiple paths provide redundancy in providing power to the load. This redundancy provides additional reliability from a load standpoint because if one path fails, the other path may still be available to provide power to the load. Controller 320 may be configured to monitor line inductor path 301 and VSCF path 302 to determine if a path is blocked, disrupted, or unsuitable for providing power to the load. For example, controller 320 may determine whether switch 330, rectifier 340, or inverter 342 are inoperable and route power through either line inductor path 301 or VSCF path 302 accordingly. If optional path 303 is provided, and switch 330, rectifier 340 and inverter 342 are inoperable, power may be routed through optional path 303.

As described above, during operation of VSCF device 300, controller 320 may continuously monitor the load to determine which path is best for distributing power. Controller 320 controls the transition of providing power to load via either line inductor path 301, VSCF path 302, or optional path 303. When VSCF device 300 transitions from providing power through line inductor path 301 to VSCF path 302, controller 320 substantially simultaneously opens switch 330 and begins operating rectifier 340 and inverter 342. When controller 320 transitions from VSCF path 302 to line inductor path 301, switch 330 may be closed when the phase of the generated power matches the phase of the load. Thus, by switching between the alternate paths, VSCF device 300 is able to provide power in the most efficient means possible for a given load.

Controller 320 may monitor several factors to determine which path is most efficient for providing power to the load. For example, controller 320 may take into account the quantity of power loss that may occur on line inductor path 301 and VSCF path 302 to determine which path optimizes engine generator efficiency. Because rectifier 340 and inverter 342 use energy to perform frequency conversion, this energy loss should not outweigh energy saved (e.g., fuel savings) by operating engine generator 310 at a lower speed.

Moreover, the type of engine generator 310 used may dictate which path controller 320 activates to provide power to the load. There are several types of engine generators that can be used in conjunction with the VSCF device of the present invention. For example, there are engine generators with different power ratings, operational speeds, efficiency, and physical sizes. Typically, larger engines provide more power and operate at slower speeds. For example, a "large" engine generator that has a power rating of 300 kW may rotate a standard four-pole synchronous generator at 1800 revolutions per minute to provide a power signal at 60 Hz. A smaller engine generator, however, may run at high speed to provide rated power. For example, such a "small" engine generator (e.g., automobile engine coupled to an alternator) may rotate a four-pole synchronous machine at 4000 revolutions per minute and provide power at a frequency of about 133 Hz.

Assuming that a "slow" speed engine generator is coupled to VSCF device 300, controller 320 may activate line inductor path 301 when the engine generator is operating at its continuous power rating. The slow speed engine may be able to provide maximum power at a higher RPM (e.g., 2000 RPM). Thus, if the load increases to such an extent that the slow engine has to operate at higher speed, controller 320 may choose to route power through VSCF path 302 to run the engine at the requisite frequency.

If a "high" speed engine generator is coupled to VSCF device 300, however, controller 320 may activate VSCF path 302 when the engine generator is operating at a continuous power rating. As mentioned above, smaller engine generators generally provide output power at frequencies above a frequency (e.g., 50/60 Hz) required by the load. Therefore, rectifier 340 and inverter 342 are used to modify the output of engine generator 310. VSCF device 300 may utilize line inductor path 301 when the smaller engine generator operates at lower speed (e.g., speed suitable for generating the desired frequency) when the load requires a lower demand.

Another aspect of the invention involves determining the optimal engine speed to maximize fuel efficiency for a given load. At any given load, a process may determine the fuel efficiency for the engine operating at its current speed. To determine if the engine can operate at a more fuel-efficient speed, a process may be implemented by controller 320 to vary the engine's speed and to calculate the fuel efficiency at each new engine speed. Then after a range of the engine's speed has been tested, the process can select the optimal speed for obtaining the best fuel efficiency at that given load. This information can also be stored in a lookup table and accessed by controller 320.

Figure 4:
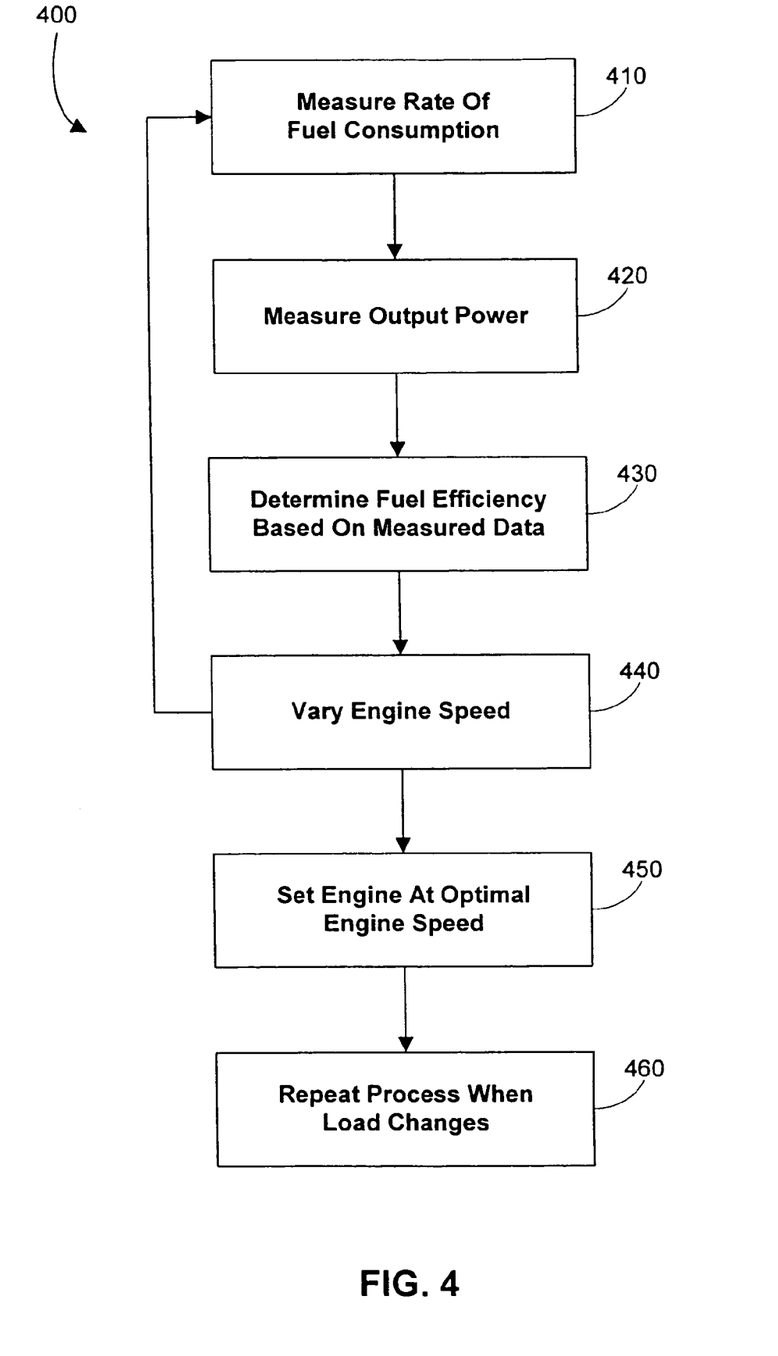
FIG. 4 shows a flow chart illustrating steps in maximizing the fuel efficiency of an engine generator in accordance with the principles of the present invention.

FIG. 4 illustrates process 400 that maximizes use of the engine generator in accordance with the principles of the present invention. Process 400 determines the optimal speed in which the engine should operate to maximize fuel efficiency for a given load. At step 410, process 400 may measure the rate of fuel consumption. A fuel flow meter, for example, may provide a quantitative measurement of the fuel consumed by the engine. Then at step 420, the output power of the engine generator is measured. Both the flow measurement and the output power are compared at step 430 to determine the fuel efficiency of the engine. The measured data may be stored, for example, in a database or in memory when process 400 takes measurements of the engine speed, fuel consumption, generated power, and efficiency. The database or memory may be included, for example, in controller 320, an engine generator, or a controller located within an engine generator. This stored data may be used to build a database of the operating characteristics of the particular engine generator providing power to the load.

At step 440, process 400 may vary the speed of the engine over its operational range. After the speed of the engine changes, process 400 may loop back to step 410 to perform another fuel efficiency calculation. The iterative process of determining the best engine speed provides a basis for building the above-mentioned database. Step 440 may be implemented in a variety of different ways. For example, the engine may be instructed to increase its speed in increments until it reaches its maximum speed rating. Then once the engine reaches its maximum speed, it may be instructed to decrease its speed in increments until it reaches its minimum speed rating. If desired, the engine may be instructed to decrease its speed first, then increase to its maximum speed.

Varying the speed over the engine's operational range may provide a record of engine performance for a given load. At step 450, once the full range of engine speed has been analyzed, process 400 may instruct the engine to operate at the speed that has been determined to provide the best fuel efficiency.

Alternatively, the engine may be instructed to vary its speed only over a portion of its operational range. This enables optimal engine speed to be determined quicker. This particular engine speed varying technique may be implemented as follows. First, the engine speed may be increased above an "original" speed by a predetermined percentage. Then a fuel efficiency measurement is performed. Next, the engine speed may be decreased below the original speed by a predetermined percentage. Once again, a fuel efficiency measurement is performed. Additional speed changes may then be performed in the direction (e.g., slower or faster speed) based on which measurement yielded the most efficient result.

For example, assume that the lower speed yielded better fuel economy. Process 400 may continue to decrease the speed (at step 440) of the engine at predetermined increments while performing fuel efficiency measurements at each increment (steps 410, 420 and 430). The process may continue to decrease the speed until efficiency declines. After process 400 discovers this transition point (i.e., decline in efficiency), the process may increase the engine speed by the predetermined increment to return to the optimal engine speed. Thus, the engine is set at the optimal engine speed, as shown in step 450.

After the optimal speed is determined for a particular load, process 400 may be repeated whenever the load changes, as indicated at step 460.

It will be understood that the steps shown in FIG. 4 are merely exemplary and that additional steps may be added and some of the steps may be omitted or modified.

Maximum efficiency for operating an engine can be determined based on a preprogrammed data table. A preprogrammed data table may include, for example, data that provides instructions for which speed a particular engine generator should operate to obtain maximum fuel efficiency for a given load. The data for this table may, for example, have been acquired through extensive laboratory testing of a particular engine generator and stored in a database. In another example, the data may have been acquired through repeated use of process 400 described in FIG. 4. Regardless of how data for the table was acquired, a controller (e.g., controller 320 of FIG. 3) may use the preprogrammed data table to determine the optimal speed for any given load.

The above-described processes are not merely limited to determining optimal fuel efficiency. The invention may also determine the optimal operating condition to minimize audible noise and/or emissions. In addition to a fuel flowmeter, an emissions sensor and a audible sensor may be used to provide emissions and noise data, respectively. The invention may also determine the optimal engine operating speed to minimize wear and tear on the engine or to increase power density of the engine.

Figure 5:
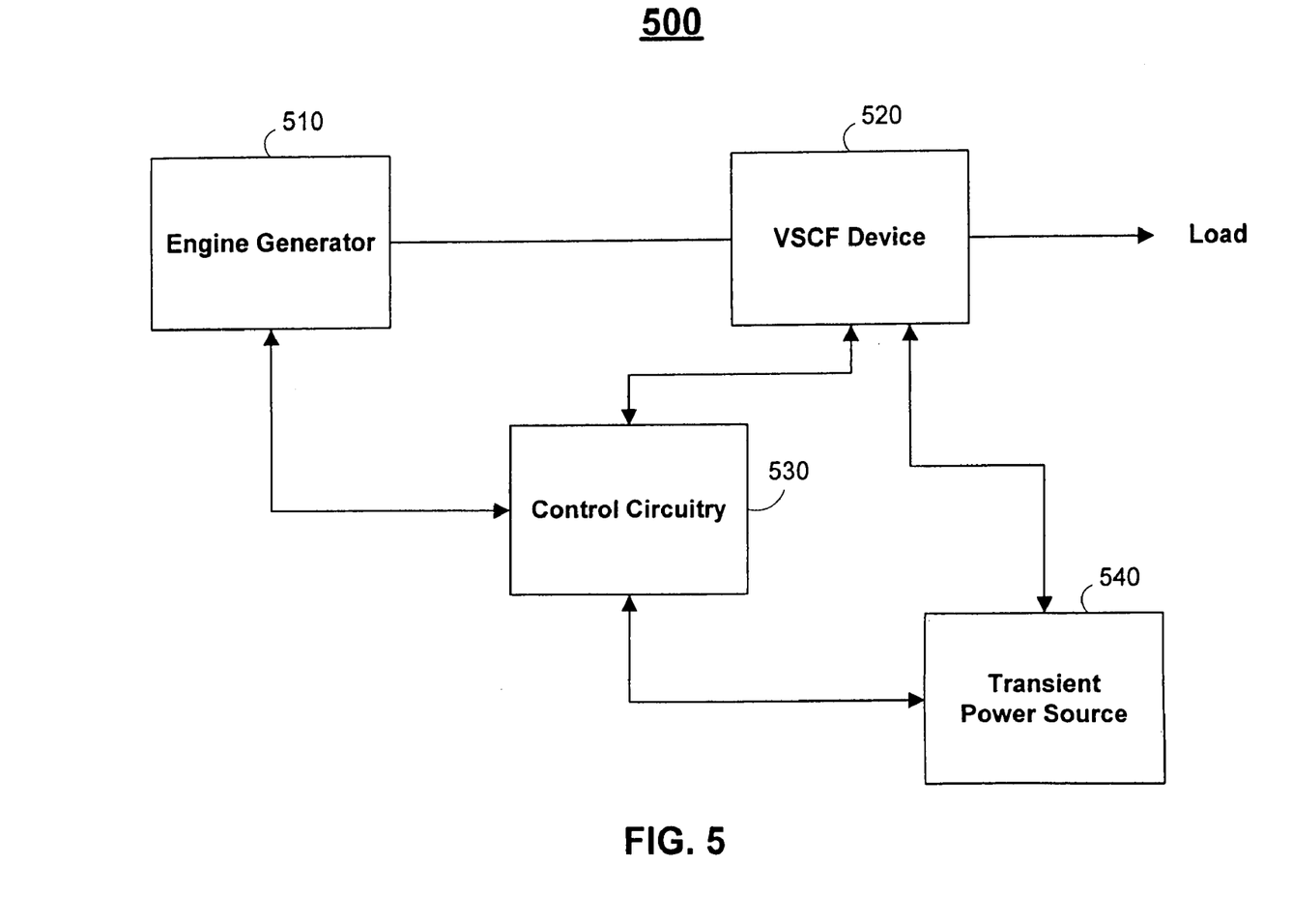
FIG. 5 is a schematic block diagram of an electrical/mechanical power supply system in accordance with the principles of the present invention.

FIG. 5 illustrates an example of how the principles of the present invention may be applied to provide an electrical/mechanical power supply system 500. System 500, which typically generates power independent of a power utility, provides power to a load through VSCF device 520. Power may be generated by an engine generator 510, which operates by burning a petroleum product (e.g., gasoline, diesel fuel), natural gas, or other combustible substance. As described above, power may be routed through one of at least two paths (not shown) of VSCF device 520 to the load. If required, power may be provided by a transient or temporary power source (e.g., a flywheel energy conversion device).

System 500 also has control circuitry 530, which may provide various functions such as, for example, monitoring power provided to the load, controlling and monitoring engine generator 510, VSCF device 520, and transient power source 540. Depending on load demand, control circuitry 530 may select a path in VSCF 520 that provides the most efficient means for power delivery. If a VSCF path is selected, control circuitry 530 may control a portion (e.g., a rectifier and an inverter) of VSCF device 520 to maintain a substantially constant frequency. If required, control circuitry 530 may instruct transient power source 540 to provide power to VSCF device 520 to ensure that the power provided to the load is maintained at a constant frequency.

Control circuitry 530 may include software that has algorithms for determining which path in VSCF device 520 is best for transmitting power to the load. In one embodiment, control circuitry 530 may include a program that determines the optimal speed in which to operate engine generator 510 for a given load. In such an embodiment, a software program may rely on a method as described above in conjunction with FIG. 4, or it may instruct the engine to operate at a specified speed based on a table or database. Regardless, system 500 provides power at a substantially constant frequency to the load while minimizing fuel consumption, emissions, and noise.

Figure 6:
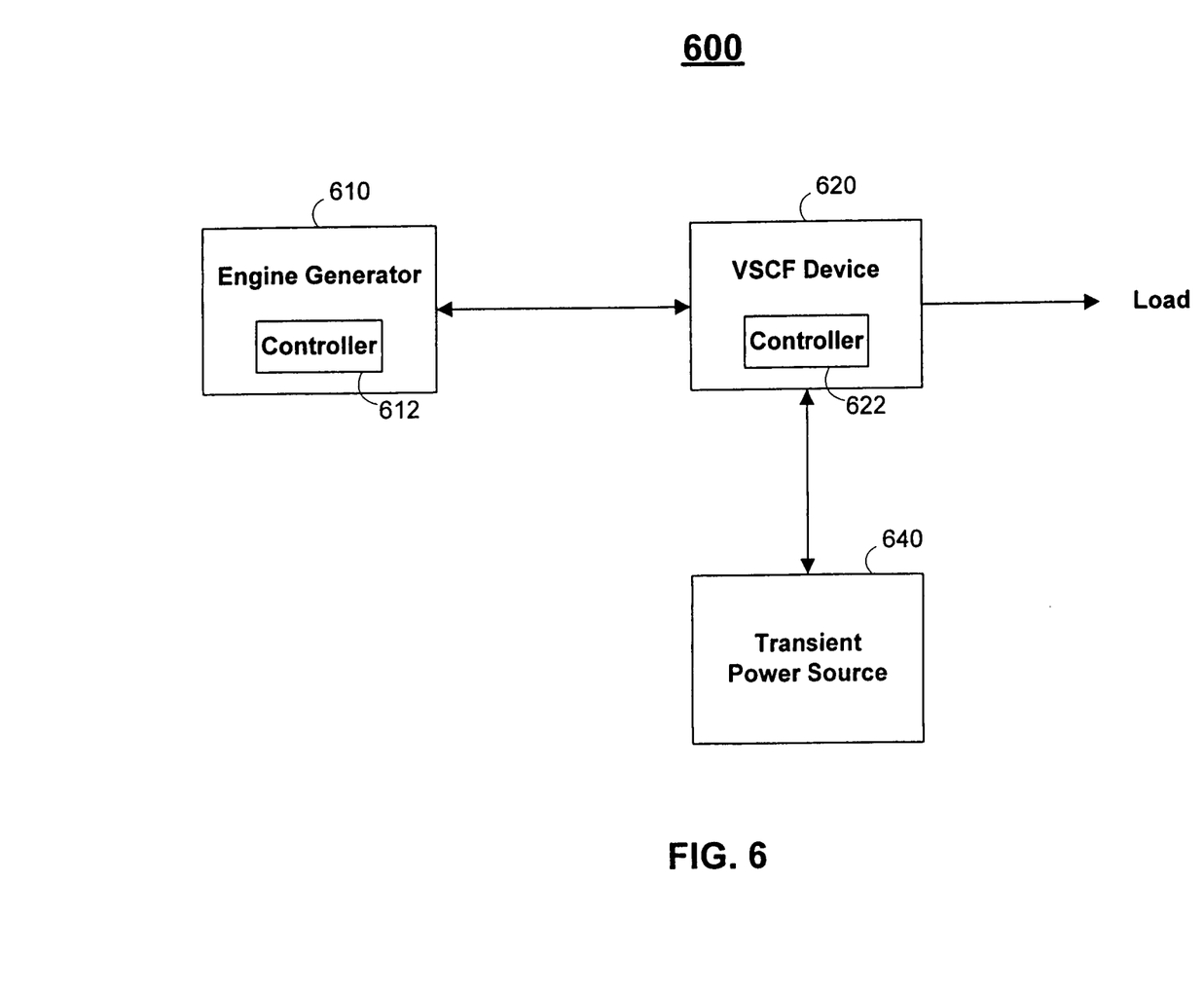
FIG. 6 is a schematic block diagram of an alternative electrical/mechanical power supply system in accordance with the principles of the present invention.

FIG. 6 shows an alternative embodiment of an electrical/mechanical power supply system 600 that is in accordance with the principles of the present invention. System 600 includes similar features as those embodied in system 500 of FIG. 5. That is, system 600 uses engine generator 610 to generate power and delivers that power to a load via VSCF device 620. System 600 also includes transient power source 640 that provides power on demand to VSCF device 620 to ensure that the frequency of the power provided to the load is maintained at a constant frequency.

This alternative embodiment allows for distributing various VSCF functional operations (such as those functions performed by controller 530 of FIG. 5) between separate controllers that are housed in the VSCF device and the engine generator, such that the separate physical controllers perform various VSCF functions independently of each other. As shown, system 600 provides controllers 612 and 622, which are implemented on engine generator 610 and VSCF device 620, respectively. Controller 622, which is specifically associated with VSCF device 620, can perform functions such as, for example, load sensing, selecting a path (inductor path, VSCF path, or any other suitable path), controlling the inverter pair (rectifier 340 and inverter 342 of FIG. 3), or any combination thereof. Controller 612, which is specifically associated with engine generator 610, can perform functions generally directed to engine generator operation such as, for example, engine speed and power generation. If desired, information relating to optimum performance parameters that are specific to engine generator 610, such as power density, fuel efficiency, noise levels and pollution levels, may be stored in controller 612 so that the engine can operate most effectively.

System 600 is advantageous because it is readily adaptable to operate with advanced engine generators. Advanced engine generators may contain electronics that enable each to perform functions such as operating at varying speeds and controlling the engine speed independent of other control circuits. Using this approach, controller 622 of VSCF device 620 may choose a path based on load characteristics and other parameters, and controller 612 can chose which speed/power it should operate.

In another embodiment, such advanced engine generators can be constructed to control functions that are typically associated with VSCF device 620 in addition to the functions associated with engine generator 610. For example, controller 612 can control both engine generator 610 and VSCF device 620.

In yet another embodiment, VSCF controller 622 may be configured to control engine generator 610 and controller 612 may be configured to control VSCF device 620.

Thus it is seen that a VSCF device may use a multi-path architecture to provide optimal operation of an engine generator while providing power at a predetermined frequency. It is also seen that methods of determining optimal engine operating speeds may be implemented to increase fuel economy and to reduce noise and air pollution. A person skilled in the art will appreciate that the present invention can be practiced by other than the described embodiments, which are presented for purposes of illustration rather than of limitation, and the present invention is limited only by the claims which follow.

The invention claimed is:

1. A multiple path system for providing power from a power source to a load, said system comprising:
   a first path coupled between said power source and said load;

a second path coupled between said power source and said load; and control circuitry coupled to said first path and said second path that automatically selects the path through which power is routed to said load, said control circuitry automatically selects the path that maximizes efficiency of power delivered to said load.

2. The system of claim 1, wherein said second path comprises:

variable speed constant frequency (VSCF) circuitry that is controlled by said control circuitry.

3. The device defined in claim 2 further comprising:

a transient power source coupled to said VSCF circuitry and said control circuitry and operative to provide power to said load via said second path.

4. The system of claim 1, wherein said first path comprises:

a switch that is controlled by said control circuitry, wherein when said switch is CLOSED, power is routed through said first path to said load.

5. The system of claim 1, wherein said control circuitry selects said first path or second path based on a load condition.

6. The system of claim 1, wherein said control circuitry selects said first path or second path based on a power source condition.

7. The system of claim 1, wherein said power source comprises an engine-generator.

8. A method for selecting a path through which power is routed from a power source to a load, said method comprising:

routing power to said load from said power source through a path selected from at least two paths, one of said paths is a variable speed constant frequency (VSCF) line path and another one of said paths is a standard line path; and selecting the path that maximizes efficiency of power delivered to the load.

9. The method of claim 8, wherein said power source provides power having a frequency, said method further comprising:

providing power having a predetermined frequency to said load.

10. The method of claim 9, wherein said providing comprises:

selecting said path which ensures that said power being provided to said load is maintained at said predetermined frequency.

11. The method of claim 8, further comprising:

controlling the power output of said power source.

12. The method of claim 8, wherein said routing comprises:

selecting said standard line path by closing a switch associated with said standard line path and ceasing operation of circuitry associated with said VSCF line path.

13. The method of claim 8, wherein said routing comprises:

selecting said VSCF path by operating circuitry associated with said VSCF line path and opening a switch associated with said standard line path.

14. For use in a power supply system having an engine generator that generates power for a load and a variable speed constant frequency (VSCF) device for routing power from said engine generator to said load, comprising:

an input node for receiving power;

an output node for transmitting power;

at least two paths for routing power from said input node to said output node; and control circuitry that automatically selects one of said at least two paths through which power is routed, said control circuitry selects the path that maximizes efficiency of power delivered to the load.

15. The device of claim 14, wherein one of said at least two paths comprises a standard line path.

16. The device of claim 14, wherein one of said at least two paths comprises a variable speed constant frequency (VSCF) line path.

* * * * *